May 10, 1955     F. H. MUELLER     2,708,096
VALVE DEVICES
Filed Oct. 23, 1951     2 Sheets-Sheet 1
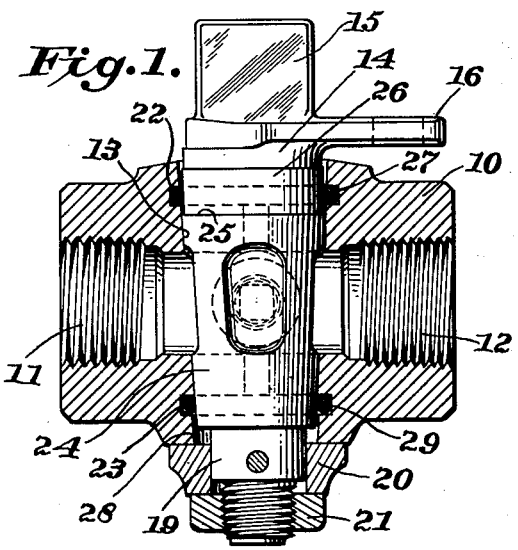
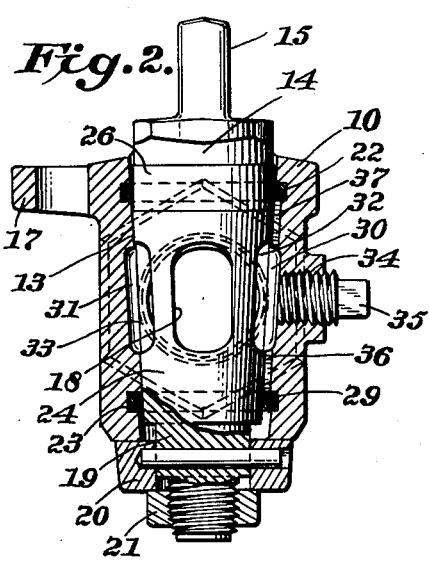
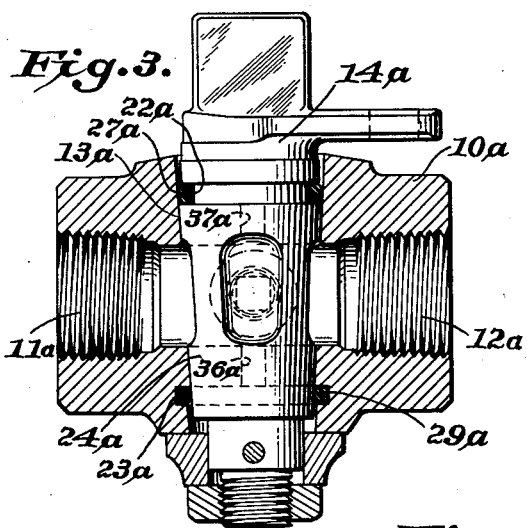
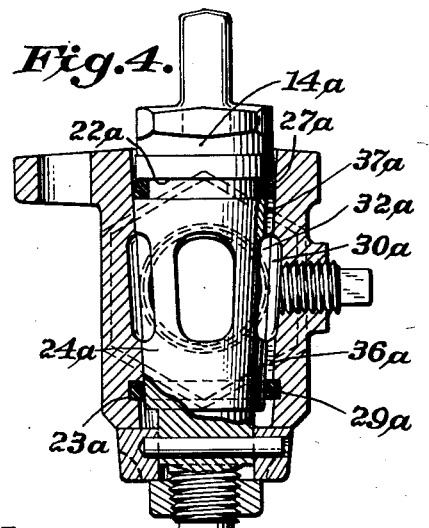
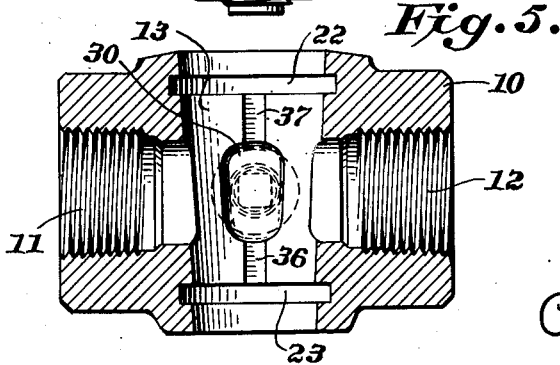
INVENTOR:
*Frank H. Mueller,*
BY
*Cushman, Darby & Cushman*
ATTORNEYS May 10, 1955 F. H. MUELLER 2,708,096
VALVE DEVICES
Filed Oct. 23, 1951 2 Sheets-Sheet 2

INVENTOR:
Frank H. Mueller,
BY
Cushman, Darby & Cushman
ATTORNEYS.

United States Patent Office 2,708,096
Patented May 10, 1955

2,708,096

VALVE DEVICES

Frank H. Mueller, Decatur, Ill., assignor to Mueller Co., Decatur, Ill., a corporation of Illinois Application October 23, 1951, Serial No. 252,701

2 Claims. (Cl. 251—309)

The present invention relates to valve devices and, more particularly, to valve devices of the rotary plug type.

It is usual to provide means to lubricate the seating surfaces of certain types of rotary plug valves, the purpose of the lubricant being to render the plug readily rotatable as well as to assist in maintaining a seal. However, the use of lubricant usually requires that at least the axial ends of the seating surfaces be sealed in some manner to prevent escape of lubricant and consequent interruption of the seal as well as leakage of fluid.

Provision of such sealing means usually requires packings having special fittings associated therewith and which arrangements not only make the structure of the valve device somewhat more complicated but may introduce an added drag upon the operation of the plug.

Furthermore, if sealing means is provided at the extreme ends of the plug, an unnecessarily large area of the plug must be lubricated. Also, in some valve devices, means has been placed intermediate the length of the plug to provide a seal against escaping lubricant. With seals provided in the latter manner, the periphery of the plug and the casing bore beyond the seal are unlubricated, thereby placing a drag against rotation of the plug at the closely fitting but unlubricated portions.

An object of the present invention is to provide a valve device wherein the seat fit portions are sealed at both ends with sealing means which apply no drag to the rotation of the plug.

Another object of the invention is to provide a highly efficient sealing means so that the axial extent of the seat fit portions can be held to a minimum.

It will be understood that one primary reason for heretofore providing valve devices with seat fit surfaces extending a substantial distance axially beyond the ports is to provide an adequate contacting or sealing surface beyond the ports. Because the present invention provides a highly efficient seal beyond the ports, it is unnecessary to have the seat fit surface extend a substantial distance beyond the ports.

A further object of the invention is to provide a simple and highly efficient means for delivering lubricant to the seat fit surfaces of a valve device.

Another object of the invention is to provide a valve device which is of simple and sturdy construction and which is economical in manufacture.

Other objects and advantages of the invention will be apparent from the following specification and accompanying drawings.

In the drawings:

Figure 1 is an axial section through a valve device of the invention.

Figure 2 is an axial section through the valve device of Figure 1, the view being taken at 90° with respect to the section of Figure 1 and portions being broken away.

Figure 3 is an axial section through a modified valve device.

Figure 4 is an axial section of the Figure 3 device, the view being taken at 90° with respect to the section of Figure 3 and portions being broken away.

Figure 5 is an axial section in the plane of Figure 1 and showing the casing element of the valve device of Figures 1 and 2.

Figure 6:
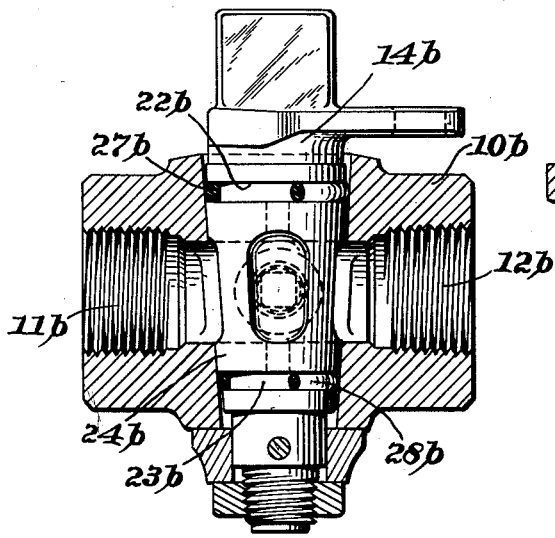
Figure 6 is an axial section of a second modified valve device.

Referring to the valve device of Figures 1 and 2, the numeral 10 designates a casing element including inlet and outlet ports 11 and 12 lying at right angles to the tapered bore 13. A tapered plug 14 including a flattened shank 15 is rotatable within the bore 13. At its larger end, plug 14 is provided with a locking arm 16 adapted to cooperate with a locking boss 17 which, as shown in Figure 2, is integral with the casing element 10. Plug 14 includes a flow port 18 adapted to be aligned with the inlet and outlet ports 11 and 12 of the casing.

At its smaller end, plug 14 includes a shank 19, the inner portion of the shank being circular and smooth and the outer portion being threaded. A collar 20 may be pinned upon the smooth portion of the shank 19 and a nut 21 upon the threaded portion of the shank 19 serves to hold the plug seated. Collar 20 bears upon the casing element 10, this bearing surface preferably being held to a minimum.

The major portion of the bore 13 and the major portion of the periphery of plug 14 are of such diameter that these portions will have a seat fit, i. e., will closely contact with each other. These seat fit portions lie between circumferential grooves 22 and 23 provided adjacent the larger and smaller ends, respectively, of the bore 13, though it will be observed that the seat fit portion 24 of the plug terminates, at its larger end, slightly inwardly of the groove 22 at that end. In other words, the seat fit portion of the casing bore 13 extends the full axial distance between the grooves 22 and 23 and the seat fit portion 24 of the plug 14 extends from the groove 23 adjacent the smaller end of the plug to terminate at a shoulder 25 immediately adjacent the groove 22. Beyond shoulder 25, the plug is slightly reduced in diameter as at 26 whereas the taper of bore 13 continues, with the result that a clearance is provided between the portion 26 of the plug and the opposed portion of bore 13. A pressure deformable endless packing ring 27 preferably formed of neoprene or other grease-resistant synthetic rubber material is positioned in the groove 22. The inner periphery of the ring 27 bears against the reduced portion 26 of the plug.

At its smaller end, plug 14 is of uniform taper beyond the bore groove 23 while, beyond this groove, the diameter of the bore is enlarged as indicated at 28 to provide a clearance between that portion of the bore and the opposed portion of the plug. A packing ring 29 of the same type as the ring 27 is positioned in the groove 23.

The packing or sealing rings 27 and 29 are of the type generally termed O-rings and are of such size in radial section that they will at least contact with both the outer walls of the grooves and the opposed surface of the plug, particularly when pressure is present within the seat fit surfaces of the valve device as hereinafter explained.

It will be understood that the pressure deformable packing rings used herein are round in radial section when free and not under pressure. However, other cross-sectional shapes may be used, such as square, rectangular, or polygonal, depending upon the particular type or use of the valve device. Thus, when the packing ring is applied to a curb-stop or the like to control water pressure, it has been found that a ring which is substantially square in radial section is highly effective.

As is best indicated in Figure 2, the bore 13 of casing element 10 is provided with a pair of opposed recesses 30 and 31 positioned on a line extending at right angles to the line of the inlet and outlet ports 11 and 12 so that the recesses are positioned midway between the mouths of these ports. Figure 5 also illustrates this arrangement. The plug 14 also is provided with recesses positioned midway between the mouths of its flow port 18, these recesses being designated 32 and 33. As is shown in Figure 5, the recesses are of the same outline as the mouths of the ports 11, 12 and 18. As is clear from Figure 2, when the plug is in open position, the recesses of the plug and casing are opposite each other. When the plug is in closed position, the recesses of the plug will be opposite the mouths of the flow ports 11 and 12 and the mouths of the plug port will be opposite the recesses of the casing.

In order to supply lubricant to the seat fit surfaces of the valve device, one of the body recesses, for example, the recess 30, has a duct 34 extending therefrom to the exterior of the casing. A threaded closure or cap 35 is threaded in the duct 34. Lubricant may be introduced into the recess 30 through the duct upon removal of the cap 35 and pressure may be applied to the lubricant by rotating the cap inwardly. In assembling the valve device, lubricant can be placed in the casing recesses 30 and 31 and the plug recesses 32 and 33 before the plug is placed in the bore. By this procedure, it is only necessary to subsequently insert grease through duct 34 for replacement purposes.

It will be understood that cap 35 is simply illustrative of various types of grease supply means which might be positioned in duct 34. For example, a valved lubricant fitting such as a grease gun fitting might be positioned in the duct.

With the recesses 30 and 31 filled with lubricant, gas which may gather in the valve element port cannot corrode the seating surface when the plug is in closed position. The ports and recesses are so spaced that a recess in the plug can never be open to both a casing port and a casing recess.

In order to direct lubricant over the entire seat fit surfaces of the valve device, passages 36 and 37 formed in bore 13 extend axially from the axial ends of the recess 30 to the ring carrying grooves 22 and 23. It will be apparent that lubricant in the recess as well as in the passages 36 and 37 will be applied to the seat fit surfaces upon rotation of the plug so that the seat fit surfaces will be thoroughly lubricated.

In addition, lubricant as well as fluid under pressure moving through the valve device will move along the seat surfaces as well as through the grooves 36 and 37 to apply pressure to the sealing ring 27 and 28. This pressure will act upon the sealing rings in such manner as to cause them to radially expand along lines normal to the axis of the plug and bore 13 so that a complete seal will be established against leakage of either lubricant or fluid from the axial ends of the valve device.

It will be perceived that by the structure described above, the seat fit surfaces will be thoroughly lubricated. In addition, because these surfaces are completely sealed at the axial ends, they need not extend as far beyond the ports as is customary, though the seal over the seat fit surfaces is more efficient than that usually obtained. In addition, it will be observed that all of the opposed peripheral surfaces of the plug and casing which actually contact with each other are thoroughly lubricated and all other portions of the peripheral surface are out of contact with each other to thereby eliminate drag.

Referring to the valve device of Figures 3 and 4, it will be observed that the casing element 10a is not provided with a groove and sealing ring at the larger end of its bore 13a. Instead, the plug 14a is provided with a circumferential groove 22a at this point and in which a packing ring 27a is positioned. The seat fit surface 24a of plug 14a extends to the groove 22a, thereby eliminating the shoulder 25 of the Figures 1, 2 and 5 valve device.

Another difference between the valve device of Figures 3 and 4 and that of Figures 1 and 2 is that the lubricant passage 37a which extends to the larger end of the seat fitting surfaces is provided in the plug rather than in the casing. As a result, grease moving from the recess 30a and 32a moves to the groove 22a and ring 27a by the passage 37a in the plug. As is the case with Figures 1 and 2, grease moving through the passage 36a in the casing reaches the groove 23a and sealing ring 29a at the smaller end of the seat fit surfaces.

In all other respects, the valve device of Figures 3 and 4 is identical with that of Figures 1 and 2.

The principal advantage of having groove 37a positioned in the plug 14a is that grease thereby is carried about the seat fit surfaces at the larger end of the bore upon rotation of the plug. In addition, when the plug is in closed position, line pressure may move through passage 37a to act upon the sealing ring 27a at the larger end of the plug. The valve normally will be so operated that when the plug is rotated to closed position, passage 37a and the corresponding plug recess 32a will be opposite the inlet port 11a of the casing so that line pressure may move from recess 32a through passage 37a to expand packing ring 27a in a plane normal to the axis of the plug.

Figure 7:
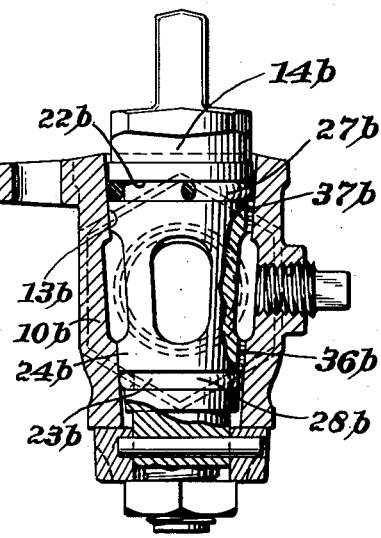
Figure 7 is an axial section of the Figure 6 valve device, the section being taken 90° with respect to the section of Figure 6 and portions being broken away.

The valve device of Figures 6 and 7 is identical with that of Figures 1 and 2 except that both of the circumferential grooves 22b and 23b of the structures of Figures 6 and 7 are in the plug element 14b rather than in the casing element 10b. This arrangement eliminates the necessity of casting or otherwise forming circular grooves in the bore 13b of the casing element. Both of the axially extending lubricant passages 37b and 36b are formed in the plug 14b. It will be observed that the seat fit surface 24b of the plug is bounded at its axial ends by the grooves 22b and 23b.

By having the lubricant passages 36b and 37b formed in the plug, rotation of the plug more quickly carries lubricant about the seat fit surfaces. In addition, when the plug is in closed position with the lubricant passages open to the pressure side of the fluid line, fluid pressure can act through these passages to cause the rings 27b and 28b to expand radially in planes normal to the plug axis.

Figure 8:
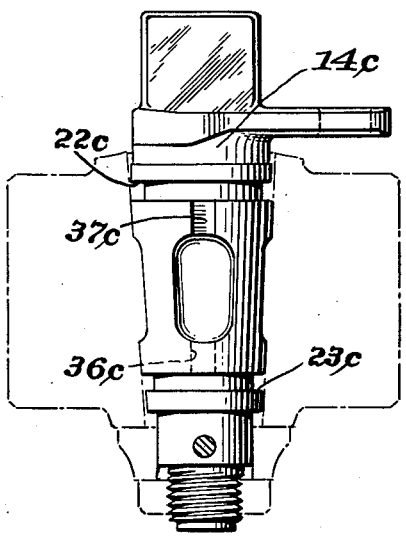
Figure 8 is an elevation of a modified form of plug element adapted to be used with the casing of Figures 6 and 7.
Figure 9:
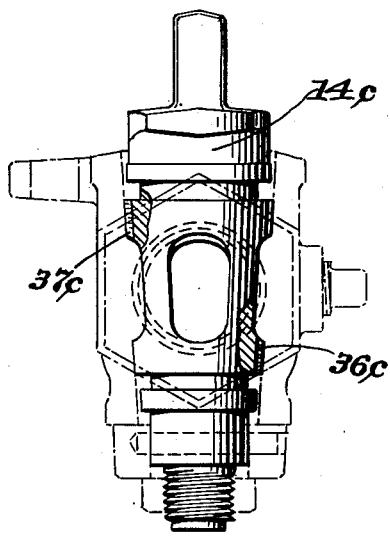
Figure 9 is an elevation of the plug of Figure 8, the view being taken 90° from the Figure 8 showing and portions being broken away.

The valve device of Figures 8 and 9 is identical with that of Figures 6 and 7 except that the lubricating passages 37c and 36c are on diametrically opposite sides of the plug 14c. This arrangement can be used to give a quicker distribution of lubricant to the seat fit surfaces by rotating the plug successively 180° in opposite directions. It will be understood that packing rings of the type discussed above will be placed in the grooves 22c and 23c of plug 14c.

It will be observed that all of the valve devices described above attain the objects stated in the opening portion of the specification and that all of the structures are highly efficient in controlling flow and preventing leakage, though the structures are of optimum simplicity and can be manufactured economically.

The terminology used in the specification is for the purpose of description and not of limitation, the scope of the invention being indicated in the claims.

I claim:
1. In a rotary plug valve the combination comprising:

a casing provided with a bore and with inlet and outlet ports opening to said bore; a plug rotatable in said bore and provided with a flow port registrable with said inlet and outlet ports; means defining a pair of diametrically-opposite recesses in the surface of said bore circumferentially intermediate said inlet and outlet ports, said recesses registering with the opposite ends of said plug flow port when the valve is closed; and means defining a pair of diametrically-opposite recesses in the surface of said plug circumferentially intermediate the ends of said plug flow port, said plug recesses registering with said bore surface recesses when the valve is open.

2. The structure defined in claim 1 wherein the width of the recesses in the plug, circumferentially thereof, is less than the circumferential width of the bore surfaces which separate the recesses therein from the bore ports, whereby the plug recesses can never simultaneously overlap a bore port and a bore recess.

References Cited in the file of this patent

UNITED STATES PATENTS

| | | |
|---|---|---|
| 552,199 | Pratt | Dec. 31, 1895 |
| 842,183 | Doolittle | Jan. 29, 1907 |
| 1,892,835 | Hamer | Jan. 3, 1933 |
| 1,933,903 | Hamer | Nov. 7, 1933 |
| 2,070,899 | Hamer | Feb. 16, 1937 |
| 2,110,557 | Seifer | Mar. 8, 1938 |
| 2,296,649 | Mueller | Sept. 22, 1942 |

FOREIGN PATENTS

| | | |
|---|---|---|
| 184,357 | Great Britain | Aug. 17, 1922 |
| 616,528 | France | Feb. 3, 1927 |